United States Patent [19]

Regnault et al.

[11] 4,292,089

[45] Sep. 29, 1981

[54] PROCESS FOR CONTINUOUSLY DISSOLVING A PARTICULATE SOLID MATERIAL, NOTABLY A LIGNOCELLULOSE MATERIAL

[75] Inventors: Alain Regnault, Ornex; Jean-Pierre Sachetto, St-Julien-en Genevois; Herve Tournier, Valleiry, all of France; Thomas Hamm, Le Lignon; Jean-Michel Armanet, Onex, both of Switzerland

[73] Assignee: Battelle Memorial Institute, Carouge, Switzerland

[21] Appl. No.: 82,221

[22] Filed: Oct. 4, 1979

[30] Foreign Application Priority Data

Oct. 4, 1978 [CH] Switzerland .................. 10298/78

[51] Int. Cl.³ ............................................ C13K 1/02
[52] U.S. Cl. ...................................... 127/1; 127/37; 209/155; 209/159; 209/162; 209/173; 260/124 R
[58] Field of Search .............. 127/1, 37; 209/162, 209/173, 155, 159; 260/124, A124; 423/658.5

[56] References Cited

U.S. PATENT DOCUMENTS

| | | | |
|---|---|---|---|
| 1,032,449 | 7/1912 | Tomlinson | 127/1 |
| 3,817,826 | 6/1974 | Hoye | 260/124 A |
| 4,119,533 | 10/1978 | Saitoh | 209/162 X |
| 4,199,371 | 4/1980 | Regnault | 127/37 |

FOREIGN PATENT DOCUMENTS 865584 10/1978 Belgium .

OTHER PUBLICATIONS

Chemical Abstracts, 75:24994b (1971).
Chemical Abstracts, 79:147589p (1973).

*Primary Examiner*—Sidney Marantz
*Attorney, Agent, or Firm*—Finnegan, Henderson, Farabow, Garrett & Dunner

[57] ABSTRACT

A fragmented material is dissolved continuously by impregnation and immersion into a solvent bath in which said material is subjected to a moderate mixing movement allowing it to be kept within the interior of said bath to undergo dissolution therein until formation of fine residual particles of insoluble material which are maintained in suspension by this movement, the whole being removed continuously by a controlled overflow of the bath. This process is applied to cellulose contained in various lignocellulosic materials, which is dissolved continuously by immersion of the previously impregnated material into a bath of hydrochloric acid through which hydrogen chloride gas is caused to bubble, to effect complete dissolution of the cellulose and suspension of the fine insoluble residual lignin particles.

7 Claims, 3 Drawing Figures

PROCESS FOR CONTINUOUSLY DISSOLVING A PARTICULATE SOLID MATERIAL, NOTABLY A LIGNOCELLULOSE MATERIAL

The present invention relates to the partial dissolution of particulate solid materials which generally leave in the solvent employed a solid residue of fine undissolved particles. The existence of such undissolved particles results either from the presence in the said materials of an insoluble fraction, or from the size of the particles, as the latter may be too large or too irregular for complete dissolution to be achieved.

The soluble or partly soluble particulate raw materials, such as lignocellulose materials, are very often available in the form of more or less irregular fragments. Accordingly, the time required for dissolving these irregular fragments can vary considerably depending on their size and shape, as the relatively small fragments can dissolve much faster than fragments which are several times larger in size.

In principle, a preliminary classification of the irregular fragments of the available raw material would allow to obtain more or less regular fragments falling within different particle-size ranges, respectively, and to be subjected in consequence to different dissolving treatments corresponding to each particle-size range. However, this leads to a considerable and often prohibitive increase in the overall cost of treatment, due to the preliminary classification, the increased number of dissolving operations, and the almost unavoidable losses of untreated material.

Similarly, a mechanically effected preliminary particle size reduction, to produce smaller and therefore more regular fragments, could in principle facilitate dissolution, but this is still relatively complicated as well as costly in general, so that it cannot be considered in numerous industrial applications.

On the other hand, when such preliminary treatments are dispensed with and the whole of the irregularly particulate mass of the available solid material is subjected to a dissolving treatment in a solvent, the undissolved residual fine particles obtained at the start of the treatment might remain uselessly in suspension, thus accumulating in the solvent and impeding the action of the latter on the particles of the material to be dissolved. It has in fact been found that an accumulation of fine particles in the solvent can prevent the efficient dissolution of the largest fragments of the starting material.

It is therefore obviously desirable to eliminate these fine particles by removing them during the treatment, but, in general, this was possible only if at the same time larger and therefore incompletely treated fragments were discharged as well.

Moreover, a subsequent separation of the large, incompletely treated fragments, followed by a recycling to subject them to repeated treatments to achieve their dissolution, is also relatively complicated and costly, so that it cannot be considered for numerous industrial applications.

Given that the above specified problems derive essentially from the more or less substantial differences between the length of treatment time required for dissolving fragments of different sizes, it is advisable to accelerate as far as possible the dissolution in each case, for example by a judicious selection of the solvent, a movement of the mixture which improves the solvent/solid contact, a temperature increase or any other appropriate means.

However, it is generally not possible to accelerate the dissolution so as to compensate closely the substantial differences between the duration of the solvent/solid contact required respectively to achieve the dissolution of large and small fragments, the sizes of which vary considerably, as is often the case with particulate raw materials the dissolving of which may be of industrial interest.

Given the economic constraints resulting from the problems mentioned above, an industrial process for dissolving particulate materials on a large scale should, as far as possible, take into account the following requirements:

A. An approximately complete treatment of the entire mass of available particulate material to be dissolved, to be achieved by the simplest possible operations and equipment.

B. The highest possible efficiency in the utilization of the solvent and of the dissolving equipment.

C. A treatment making possible the continuous dissolving of very large quantities of more or less irregularly fragmented materials.

The problems specified above, which are particularly important in a large-scale industrial process, become still more complicated if the last of the requirements stated above, namely continuous dissolving, is taken into consideration.

Indeed, it is obvious that any continuous treatment must also have for continuous output the desired products of the treatment which, in this particular case, are essentially the dissolved products obtained from the treated solid material on one hand, and the solid residue formed by undissolved fine particles suspended in the same solvent, on the other.

However, the known processes do not permit, in general, to obtain continuously solely the solvent containing the aforesaid dissolved products and the fine particles in suspension, because the larger, incompletely treated fragments, which are also suspended in the solvent, are then obtained at the same time as the fine residual particles in suspension.

There results a waste of incompletely treated particulate material, the subsequent separation of which for purposes of recycling can be prohibitively expensive in various industrial applications.

The present invention relates more particularly to an industrial application which is of great practical interest if the important problems and economic constraints mentioned above are taken into account, namely the continuous dissolving of the soluble portion of a composite material, notably of the cellulose contained in fragments of lignocellulose materials, for example various vegetable waste such as: wood shavings and sawdust, straw, bagasse, bran, etc.

As is known, the cellulose, which comprises crystalline zones blanketed by amorphous zones, can be dissolved by concentrated aqueous acids, in the course of which operation it undergoes hydrolysis; however, the crystalline part which is less accessible to the acid is much more difficult to dissolve in the acid.

Thus, to achieve a complete dissolution of the crystalline part of cellulose constitutes a major problem in the acid hydrolysis intended to lead to the saccharification of the lignocellulose materials on a large scale, with an economically acceptable yield.

It has already been proposed to facilitate the acid action on cellulose by effecting the hydrolysis at elevated temperatures and pressures, but these constitute important drawbacks with regard to the construction and operation of the equipment which must be designed to withstand these temperatures and pressures, and that in such a manner as to enable saccharification to be carried out economically and on a large scale. Moreover, an acid hydrolysis thus performed at high temperature and pressure allows, in general, only a relatively low yield of 50% of the glucose theoretically resulting from the complete hydrolysis of the vegetable matter.

It has also been proposed to raise the concentration of the acid to a value close to saturation level, in order to achieve a complete hydrolysis at ambient temperature.

However, the industrial installations proposed to date for effecting saccharification by acid hydrolysis generally suffer from the disadvantages of being relatively complicated, costly and voluminous.

According to the well-known saccharification process of Andre Hereng as described for example in U.S. Pat. No. 2,474,669, wood shavings are impregnated with hydrochloric acid of 27–33% concentration and then subjected counter-current to hydrogen chloride gas in order to raise the concentration of acid to 41% absorbed in the impregnated wood, the latter descending by gravity in a column traversed by an ascending current of gaseous hydrogen chloride.

The use of hydrogen chloride gas for increasing the titer of the hydrochloric acid employed for saccharification was also known from U.S. Pat. No. 1,544,149. Moreover, the use of hydrogen chloride gas in sachharification processes has also been described in U.S. Pat. Nos. 1,677,406 and 1,795,166.

In spite of numerous studies relating to the saccharification of wood, the industrial installations so far developed for dissolving the cellulose by hydrolysis are, as already mentioned, of a relatively complex construction and/or of a mode of functioning difficult to control, with large space requirement. In consequence, the capital and operating costs of these installations are often prohibitively high for various industrial applications.

The aim of the present invention is to provide a process making it possible to dissolve continuously large quantities of particulate solids of more or less irregular fragment shape, which are generally not wholly soluble, and in such a manner as to obviate as far as possible the problems and drawbacks referred to above.

To this end, the invention provides a method for the continuous partial dissolving in a liquid solvent of a solid particulate material comprising a soluble portion and an insoluble portion, the latter manifesting itself in the form of fine residual particles in suspension within this solvent, characterised in that:

(a) the solid material, impregnated with the solvent, is immersed in a bath constituted of this solvent which is then subjected to a moderate mixing movement promoting contact of the solid material with the entirety of the solvent within the bath during a period of time sufficiently long that it is dissolved and that the fine residual particles become suspended in the bath, the said mixing movement being such that, substantially all the fragments of the impregnated materal remain immersed within the bath;

(b) this bath is fed continuously with solvent and particulate material to be treated at such a rate that the fragments of solid material fed continuously to the bath remain essentially immersed in the interior of the bath and the upper phase of said suspension is continuously drawn off by an overflow means of the bath. This process accordingly permits a selection of the finer particles (that is to say, of the lightest particles by flotation criteria), and to avoid in this manner as far as possible the wastage of soluble but as yet undissolved portions.

Another particular object of the present invention is to provide a process which makes it possible to dissolve continuously practically all the cellulose contained in very large quantities of particulate lignocellulose materials, more or less irregularly fragmented, of different shapes and origins, whilst obviating to a large extent the problems and drawbacks mentioned above.

With this end in view, the invention more particularly provides a process for dissolving the cellulose contained in a fragmented lignocellulose material by treatment with a concentrated aqueous solution of hydrochloric acid, characterised in that:

(a) the lignocellulose material, previously impregnated with concentrated hydrochloric acid, is immersed into a bath of this acid through which bath hydrogen chloride gas is caused to bubble whilst the immersed material is subjected to a moderate mixing movement, and that said bubbling and said mixing movement are performed in such a manner and for a period of sufficient length to bring about the dissolution of substantially all the cellulose contained in the immersed material in the acid, under the combined effects of said movement and said hydrogen chloride gas, and to obtain in this manner a suspension of fine lignin particles throughout the bath containing the products of cellulose hydrolysis:

(b) this bath is fed continuously with a concentrated solution of acid and lignocellulose material to be treated at such respective feed rates that all the lignocellulose fragments fed to this bath remain essentially immersed within the bath and that the said suspension of fine lignin particles thus produced and suspended in the upper phase of the bath is drawn off continuously through an overflow means of the bath.

During the continuous dissolving of the cellulose in accordance with this process, the acid of said bath can be advantageously maintained in a HCl-saturated state with the aid of hydrogen chloride gas bubbled through this bath.

Moreover, said acid bath is preferably enclosed in a container or chamber from which the gas leaving the bath is continuously withdrawn. In this manner, degassing of said bath is achieved whilst avoiding pollution of the external atmosphere by escaping hydrogen chloride gas.

In addition, the pressure within the said chamber containing the acid bath can be slightly reduced relative to atmospheric pressure, in such a manner as to prevent any leakage of hydrogen chloride gas into the ambient atmosphere, whilst promoting the degassing of the acid bath.

Furthermore, the said mixing movement of the fragmented material immersed into the bath can be brought about, at least partly, by the mechanical effects of the said bubbling action, a quantity of gas sufficient to achieve this mixing movement being obtainable in particular due to the said recycling and repeated passage of the gas through the bath.

In this manner, it is possible to combine this bubbling action with this mixing movement within the acid bath, maintaining the bath in a state of saturation, enclosing the bath in said chamber, degassing it and recycling the hydrogen chloride gas whilst subjecting the latter to repeated passages, the whole in such a manner as to ensure optimum conditions for dissolving continuously, rapidly, and in a simple and economic manner, all the cellulose in the lignocellulose material treated.

It has been found furthermore that the combined effects, on the solid fragmented lignocellulose material, of a bubbling through of HCl gas in a bath of concentrated hydrochloric acid, and of a simultaneous moderate mixing movement, allow not only to accelerate considerably the complete dissolving of the cellulose contained in this solid material, but also to reduce substantially the quantity of liquid acid required to achieve such a complete dissolution.

Thus, for example, it was found in practice possible to dissolve completely the cellulose contained in straw treated in a bath of 39% hydrochloric acid, in which the solid/liquid (straw/acid) weight ratio was approximately 1:2 and wherein the straw was subjected to the combined effects of a bubbling through of HCl gas and a moderate mixing movement of the acid of the bath. The saturation level in dissolved products originating in the cellulose was of 700 grams; this level is generally not reached in the present process.

It is moreover possible to reduce the quantity of the solvent employed in the process according to the present invention, by a recycling of the solvent containing the materials dissolved during passage through the bath, in such a manner as to make possible the repeated use of the solvent to treat the largest possible quantity of solid material to be dissolved, until this solvent becomes more or less saturated.

In the process according to the present invention, it is therefore provided to adapt to each other the said solid and bath liquid feed rates and the said moderate mixing movement, and this in such a manner that the solid fragments remain essentially immersed within the bath until their approximately complete dissolution under the best possible conditions in each case, whilst withdrawing from this bath continuously, by a simple discharge or overflow means, a suspension containing essentially the said fine residual particles in the solvent carrying the dissolved products.

As will be apparent from the detailed description given in the following, the invention can be performed with relatively simple equipment, so that it is possible not only to employ with ease, in each case, all the means capable of promoting a continuous dissolution as fast and as complete as possible, but also a continuous and selective separation and evacuation of the said fine residual particles in suspension.

This continuous selective evacuation of the fine residual particles is obtained, according to the invention, on the one hand by a classification in which the relatively large fragments are retained in the interior of the bath and the said fine residual particles are suspended on the surface of the bath, and, on the other hand, by a simple discharge or overflow of the excess bath liquid. In other words, the degree of agitation is so adjusted that the finer particles are maintained in suspension on the surface layers of the liquid, whilst the coarser particles, as yet imperfectly hydrolysed, are retained in the lower layers of the liquid until their definitive reduction to fine insoluble particles.

However, it is obvious that such a selective classification and evacuation is only possible when the fragments of the solid material to be dissolved are subjected to a sufficiently moderate mixing movement to ensure that these relatively large fragments cannot remain in suspension as well at the surface of the bath, which would lead to a premature discharge of incompletely treated fragments.

This continuous selective evacuation of the fine residual particles thus makes possible an optimum exploitation of the bath, enabling a continuous replacement of the evacuated fine particles by fresh fragmented material to be dissolved. This classification (by decantation) will, in addition, determine the respective residence times during which the different fragments of the solid material are subjected to dissolution and thus undergo a size reduction until the fine residual particles are obtained.

Thus, such a classification by selective decantation and evacuation can be performed continuously by relatively simple means when performing the present invention.

However, in all cases where, for whatever reason, it would be too difficult to achieve a practically complete dissolution in a single bath, as well as removal as selective as described above, that is to say, when the suspension removed by overflow from the bath contains not only fine residual particles but also larger, incompletely dissolved fragments, the invention can be easily performed in several stages in baths disposed in series (in cascade). This permits to ensure complete dissolution in consecutive stages in which the solid fragments undergo a gradual size reduction and a corresponding classification from one bath to the next.

An experimental study carried out within the framework of the present invention yielded the following results which are of interest with regard to the dissolution of cellulose:

On immersing cereal straw impregnated with aqueous HCl in a bath of hydrochloric acid of 39% strength at 30° C. held in a container, the solid/liquid (straw/acid) weight ratio in this bath being 1:7, and subjecting this bath to a slow stirring and a bubbling-through of hydrogen chloride gas (the excess of which after passing through the bath is evacuated continuously from the container), the complete dissolution of the cellulose contained in the straw is achieved in 15 minutes.

By contrast, when the same dissolution is carried out in the absence of the said bubbling through of HCl gas, the other conditions remaining the same as described above, the time required for obtaining the same result, namely the complete dissolution of the cellulose contained in the straw, rises to 45 minutes.

This shows that the dissolution rate of the cellulose is considerably accelerated (in this case three times faster) owing to the action of the HCl gas introduced, the time required for complete dissolution being reduced in these preparations.

In consequence, in a total treatment time of 45 (3×15) minutes, the effect of HCl bubbling makes it possible to treat three times more straw in the same quantity of acid than with only a mixing movement of the mass (without bubbling).

It therefore appears obvious that this bubbling with HCl gas exerts a considerable effect on the complete dissolution of all the cellulose contained in the straw, the time as well as the quantity of acid required for achieving this dissolution being reduced by a factor of 3 due to this bubbling.

Similar treatments, but carried out in acid baths of notably lower concentrations, for example down to 35%, made possible a complete dissolution of the cellulose of the straw when bubbling HCl gas through the bath which was slowly stirred, whilst, in order to obtain the same result in the absence of gaseous HCl, it was necessary to employ an acid of at least 39% strength and to agitate the bath to achieve such a complete dissolution, and this in a notably longer time.

The results given above demonstrate that the combined effect of the gaseous HCl introduced into the acid bath and the mixing of the particulate lignocellulose material (straw) offers the following important advantages:

The cellulose can be completely dissolved, at a fast rate.

The solid, bulky lignocellulose material can be transformed rapidly into a suspension of lignin in acid, so that the treating capacity of the bath per unit volume can be increased accordingly, as well as the rate of evacuation of the residual lignin in suspension.

It becomes possible to dissolve completely the cellulose in a bath of hydrochloric acid having a substantially lower concentration (for example 35%), which can be obtained at a lower price.

The quantity of liquid acid necessary for dissolving completely the cellulose in a bath of a given volume is reduced.

The following detailed description illustrates different modes of execution of the invention, with the aid of the attached drawings, in which.

Figure 1:
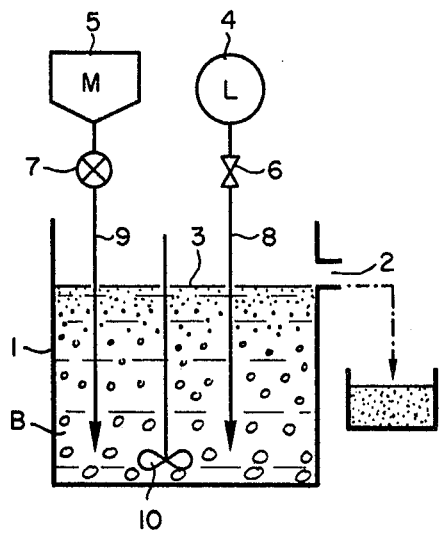
FIG. 1 is a schematic view, illustrating the mode of functioning of an apparatus for performing the invention.

As apparent in the diagram of FIG. 1, the general principle of functioning of an apparatus for performing the invention can be explained as follows:

The dissolving of the particulate solid material M is effected in a bath B of liquid solvent L disposed in a dissolving chamber 1 having an outlet 2 in the shape of a spout for discharging the overflow of this chamber 1 at the height of surface 3 of the bath B.

Two feeder devices 4 and 5 serve to supply this bath B continuously with liquid solvent L and solid fragmented matter M, respectively. These devices 4 and 5 are fitted with control means 6 and 7 for regulating, respectively, the feed rates of the solvent L and the material M to the bath B.

As indicated in FIG. 1, these devices 4 and 5 are additionally fitted respectively with feeder pipes 8 and 9 which in this case open into the lower portion of the bath B. This makes it possible to ensure, on one hand, the complete impregnation and the complete immersion of the material M fed continuously to the bath B and, on the other hand, to avoid the direct movement of the liquid solvent L and of solid material M towards the outlet spout 2.

The solid fragmented material M thus impregnated continuously and immersed, which would tend to fall to the bottom of bath B, is subjected to a moderate stirring movement, especially in the lower portion of this bath, as has been indicated schematically in FIG. 1 by a stirrer 10 located in the lower portion of bath B. This moderate mixing movement is selected according to the invention in such a manner that it promotes, on one hand, as far as possible the intimate contacting of all the immersed solid material with the totality of the solvent in the bath B, in order to avoid an accumulation of this solid material M at the bottom of the bath, by moving it continuously within the interior of the bath. In this manner, this movement serves to promote a dissolution of all fragments of the solid material M as fast and as complete as possible, said material being continuously fed to the bath B and immersed therein, so that the fragments may all be dissolved whilst undergoing a size reduction until they leave only fine residual undissolved particles in suspension within the solvent of the bath.

In addition, to this continuous stirring of the solid fragments within the bath B, said moderate mixing movement numerals selected, on the other hand, according to the invention in such a manner that said fine particles are maintained in suspension in the solvent as a whole, the finest particles being located in proximity to the surface 3 of bath B, in order to make possible their removal continuously by way of the overflow at the level of the discharge outlet 2 of chamber 1.

In this manner it is possible to obtain, by an appropriate selection of the moderate movement of the mixture as provided according to the invention, a classification, by decantation, of the immersed solid fragments undergoing dissolution, so that the largest fragments will tend to remain in proximity to the bottom of the bath 1; that the fragments ascend in the bath as they decrease in size; and that essentially the fine residual particles arrive to float in the immediate proximity of the surface 3 of the bath to be continuously discharged through the discharge-outlet 2, to a tank 11 for storing the products of the dissolving process.

Figure 2:
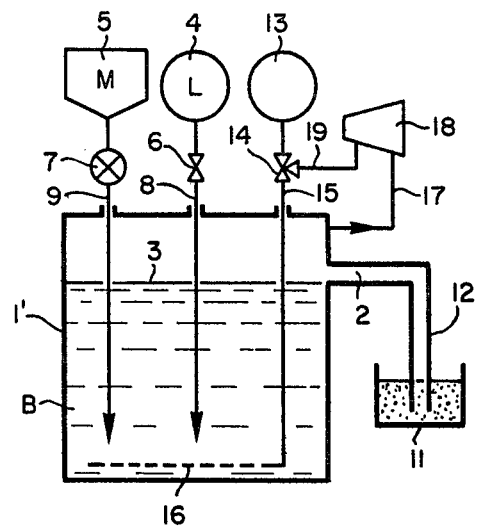
FIG. 2 shows a modified embodiment of the apparatus according to FIG. 1.

FIG. 2 shows a variant of FIG. 1, designed for the continuous dissolution of the cellulose contained in a fragmented lignocellulose material. All the analogous elements bearing the same reference numerals in FIGS. 1 and 2 have already been described with reference to FIG. 1.

However, in this variant according to FIG. 2, the chamber 1 of FIG. 1 has been replaced by a closed chamber 1' which encloses completely the bath B as well as the space located above its surface 3; the discharge outlet 2 of this chamber is connected by a discharge conduit 12 to the storage tank 11 for the products of the dissolving operation, constituting a bath under atmospheric pressure, into which this conduit 12 opens gas-tight.

The bath B of this variant is formed by concentrated hydrochloric acid supplied continuously by the feeder device 4,6,8 and intended to dissolve the cellulose contained in the lignocellulose material supplied continuously by the feeder device 5,7,9.

This variant according to FIG. 2 comprises in addition a third feeder device 13 to 16 for feeding the bath with hydrogen chloride gas through a three-way valve 14 mounted in a gas feed conduit 15 to a bubble pipe 16 sited along the bottom of the bath B. This third feeder device 13 to 16 serves to cause an adjustable quantity of HCl gas to bubble through the concentrated acid bath B as a whole. The excess of HCl gas bubbled through the bath B is moreover evacuated from the closed chamber by means of an exhaust pipe 17 connected, via a blower 18 and a recycling pipe 19, to an inlet of the three-way valve 14 (the other inlet of which is connected to the HCl gas source 13).

The already mentioned moderate mixing movement can be obtained in this case at least partly by a relatively moderate agitation of the bath B due to the bubbling through of HCl gas, the working quantity of which can be controlled by means of the three-way valve 14. On the other hand, this movement can also be brought about by means of a stirrer such as the stirrer 10 already mentioned with reference to FIG. 1.

The continuous dissolving is then achieved in this variant essentially in the manner already described above, taking into account the previously indicated results.

Figure 3:
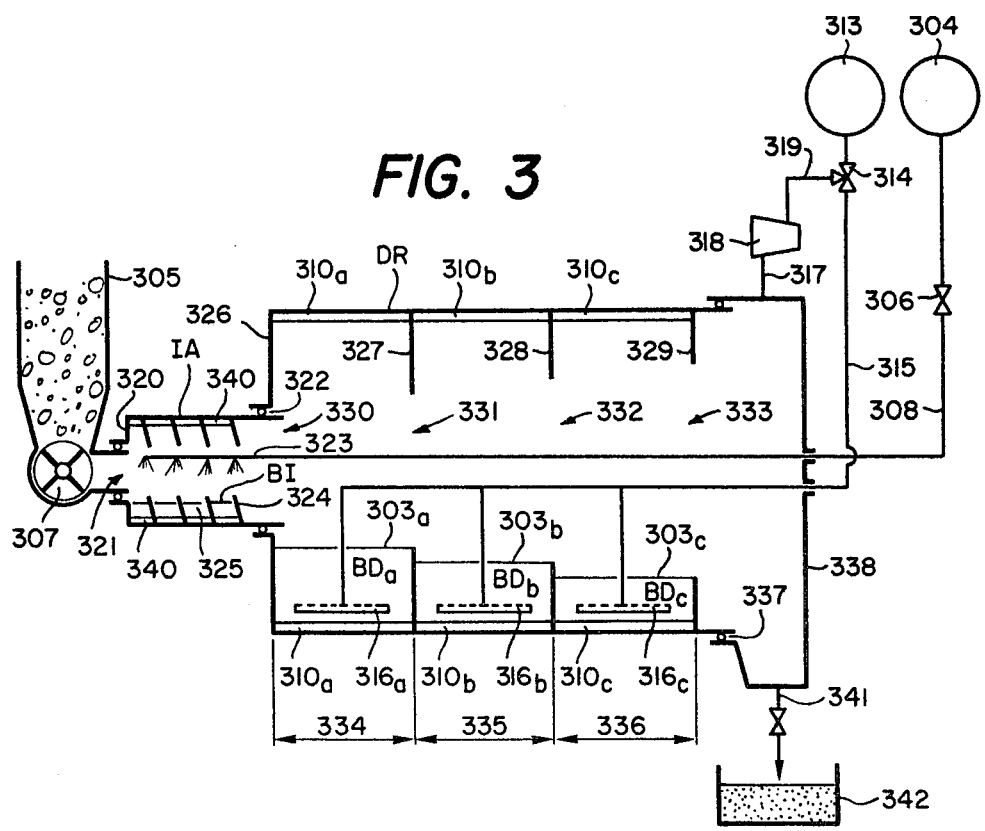
FIG. 3 shows a longitudinal schematical section of a form of embodiment of a rotary apparatus for performing the invention.

FIG. 3 shows a longitudinal section of a form of embodiment conceived especially as a rotary tubular horizontal reactor for carrying out the continuous dissolving according to the present invention, more especially for dissolving the cellulose contained in a lignocellulosic material.

This rotary reactor according to FIG. 3 comprises two parts:

an auxiliary feed and impregnation drum 1A having an inlet end provided with a transverse wall 320 comprising an axial inlet 321 for admitting the solid fragmented material and a free outlet end.

a main drum DR having an inlet end which communicates with the free outlet end of the auxiliary drum 1A by way of a joint 322, and an outlet end 341.

The fragmented solid material M to be treated is supplied continuously from a storage hopper 305 by way of an adjustable distributor 307 communicating with the axial inlet 321 of the auxiliary drum 1A. This drum 1A is furthermore continuously fed with liquid solvent supplied by a distributor 323 of liquid connected to a solvent source, in the present case a tank 304 of concentrated hydrochloric acid, by means of a feed pipe 308 fitted with a valve 306 for controlling the flow rate of the solvent feed.

The auxiliary drum 1A is fitted with a plurality of radial vanes 340 distributed peripherally and longitudinally on its inner face and with a helical baffle 324 also projecting from this inner face, but having a greater radial dimension than the vanes 340, in such a manner that the helical baffle 324 defines a helical channel 325 which is open in the direction of the interior of this drum 1A.

The liquid solvent which is supplied continuously by the distributor 323 thus falls into this helical channel 325 to constitute there an impregnating bath B1 between the turns of the baffle 324. The fragmented solid material which is supplied continuously with the aid of the adjustable distributor 307 to the axial inlet 321 falls into the said impregnating bath B1 from where this solid material is raised cyclically by the radial vanes 340 during the rotation of the drum 1A and thus undergoes a rotating movement. Thus, the solid material undergoes in this manner a cyclical immersion into the impregnating bath B1, owing to the said rotating movement with an ascending trajectory during the rise of vanes 340, alternating with an ascending movement in which this solid material falls back into the solvent bath.

This cyclical immersion thus ensures, due to the action of vanes 340, a very intimate mixing of the totality of the fragmented solid material with the liquid solvent of the bath, while the helical baffle 324 ensures at the same time the longitudinal forward movement of the solvent of the impregnation bath B1 and of the fragmented solid material, functioning in the manner of an Archimedean screw.

Owing to this cyclical immersion into the bath B1 which advances along the auxiliary drum 1A under the effect of the helical baffle 324, the solid fragmented material fed continuously to this drum undergoes therein very rapidly a complete impregnation, the duration of which can be adjusted as a function of the speed of rotation of this rotary drum 1A.

The structure and the mode of functioning of this rotary drum 1A have already been described in Swiss Patent Application No. 4120/77 incorporated by reference in the present application, but they are given here solely by way of an example of embodiment of a device which makes it possible to effect continuously a complete preliminary impregnation, prior to carrying out the dissolving treatment proper according to the present invention.

In other words, although the above described auxiliary drum 1A permits a partial dissolving, it serves here essentially for impregnating completely, rapidly and continuously the solid material to be subjected to the continuous dissolving treatment in the main drum DR which constitutes the principal rotating reactor, and to ensure in this manner the continuous feeding of the latter with metered, adjustable quantities of the solid fragmented material already impregnated and with the solvent serving for the dissolving treatment.

As will appear from FIG. 3, the principal drum DR constituting the rotary reactor is equipped with a series of annular transverse walls 326 to 329 having, respectively, central apertures 330 to 333 the diameter of which increases from each wall to the next and which respectively define three successive dissolving chambers 334 to 336 communicating with each other by the respective central apertures 331 and 332.

The first transverse wall 326 of this principal drum or reactor DR is located at its inlet end and has a central inlet aperture 330 (see FIG. 3) the diameter of which is smaller than that of the aperture 331 of the next wall 327.

This main drum/reactor DR is thus continuously fed with solvent and impregnated fragmented solid material owing to the action of the helical baffle 324 during the rotation of the auxiliary drum 1A. The solvent arriving at the free outlet of this drum 1A, which coincides with the axial inlet 330 of the main drum/reactor DR, then flows continuously into the first chamber 334 so as to form there a dissolving bath $BD_a$ which fills the lower portion of this chamber 334, to pass thereafter by overflow effect from this bath over the lower edge of the second central aperture 331 of wall 327 at the inlet of the intermediate chamber 335 to form in the latter an intermediate dissolving bath $BD_b$. This bath discharges in the same manner to the aperture 332, forming finally in the last chamber a third bath $BD_c$ of solvent which discharges to the central aperture 333 of the last transverse wall 329 of this main rotating drum/reactor DR, the outlet end of which is connected, by a gas-tight joint 337, to a fixed collector chamber 338. From this chamber 338 the liquid then flows through the outlet 341 to a collector tank 342.

The impregnated fragmented solid material arriving and the free outlet of the auxiliary drum flows continuously, at the same time as the solvent, into the first chamber 334 in which it is immersed into the first bath $BD_a$ of the solvent designed to dissolve this solid material.

The rotary drum/reactor DR thus encloses an acid bath subdivided into three elementary baths $BD_a$ to $BD_c$ disposed in cascade and designed for the complete dissolution of the cellulose.

As FIG. 3 further shows, three fixed bubble pipes $316_a$ to $316_c$ are immersed respectively in the bottom of baths $BD_a$, $BD_b$ and $BD_c$ in the chambers 334 to 336 and connected to a common feed pipe 315 fitted with a three-way valve 314 having a first inlet connected to a feed tank 313 containing a pressurized gas intended for being bubbled through the baths $BD_a$ to $BD_c$. A second inlet of this valve 314 communicates with the upper portion of the collector chamber 338 by means of an exhaust pipe 317, a gas suction 318 and a gas recycle pipe 319.

The chambers 334 to 336 of the drum/reactor DR are in addition provided each with a series of small radial internal vanes of small height, $310_a$, $310_b$ and $310_c$, respectively intended to sweep the bottom of the corresponding baths $BD_a$ to $BD_c$.

When the drum/reactor DR is driven slowly, for example at a rate of one revolution per minute, the impregnated solid material which is immersed in the bath $BD_a$ of solvent formed in the first annular chamber 334 is subjected continuously to a moderate mixing movement which permits an intimate contacting of the whole of this immersed solid material with the totality of the solvent in the bath.

This moderate mixing movement is selected, on one hand, in such a manner that it promotes the continuous rapid dissolving of this solid material, thereby accelerating its conversion into fine undissolved residual particles, and that in addition it suffices to keep these particles in suspension up to the surface of bath $BD_a$, in order to make possible their continuous removal with the aid of the liquid solvent which is discharged into the next bath. On the other hand, this mixing movement must be sufficiently moderate to ensure that the substantially larger fragments of the solid material undergoing dissolution remain within the bath $BD_a$ until they are converted into fine residual particles in suspension, which are then removed continuously with the aid of the liquid solvent which pours into the next bath $BD_b$.

An appropriate choice of this moderate mixing movement will thus make it possible to obtain a continuous dissolution, in a more or less rapid manner, combined with a classifying effect along the height of the solvent bath $BD_a$, the resulting fine particles being suspended at the surface of this bath at being in consequence continuously removed with the aid of the liquid solvent which flows from this surface into the next bath $BD_b$, whilst the larger fragments of the solid tend to undergo sedimentation and to remain consequently in the first bath $BD_a$ to undergo dissolution therein.

In the main rotary drum/reactor DR described above, (FIG. 3), the said moderate mixing movement, as provided according to the invention, is obtained, in part by the revolving movement of the drum DR and the small vanes $310_a$ to $310_c$ associated therewith relative to the fixed bubble pipes located respectively in proximity of the bottom of baths $BD_a$ to $BD_c$.

Since the large impregnated lignocellulose fragments tend to undergo sedimentation in the first bath $BD_a$, they will thus be continually agitated and subjected to the combined effect of the said moderate mixing movement with the acid in the interior of this bath and the bubbling hydrogen chloride gas passing through said bath, the cellulose contained in this lignocellulose material thus being enabled to dissolve rapidly owing to this combined effect. The liquid arriving in chamber 338 can be collected as such in the tank 342 or subjected to further operations for separating the solid with the evaporation liquid of the latter, drying of the solid or drying by pulverization of the suspended solids.

The mode of functioning of this embodiment according to FIG. 3 can be further explained in the following manner:

The concentrated hydrochloric acid, of which a controllable quantity is supplied continuously by the feeder means 304, 306, 308 and 323 already mentioned, serves initially to impregnate completely with acid the solid fragmented lignocellulose material of which a controllable quantity is supplied continuously to the inlet of the auxiliary drum 1A by the feeder means 305, 307.

The helical baffle 324 of this auxiliary drum 1A causes, at a speed adjustable as a function of the speed of rotation of this drum 1A, the concentrated liquid acid and the impregnated solid material to advance, and these then pour together into the first dissolving chamber 334 of the drum/reactor DR, where they firstly form a first dissolving bath $BD_a$ until the overflow level defined by the central aperture 331 is reached (the diameter of the latter being greater than that of the inlet aperture 330).

The solid impregnated material is thus subjected to dissolving continuously in accordance with the present invention, under the aforementioned combined effects (moderate mixing with the acid and bubbling through of gaseous HCl), initially in the first chamber 334 of the main reactor DR.

Owing to the said combined effects (mixing/bubbling), the cellulose contained in the lignocellulose material dissolves very rapidly in the first concentrated acid bath $BD_a$, so that the size of the fragments of this material is rapidly reduced in consequence.

The fine (insoluble) residual lignin particles which result from the more or less complete dissolution of said fragments are, on one hand, continuously maintained in suspension in the whole of this first bath ($BD_a$) due to the aforesaid moderate mixing movement, until reaching the surface $303_a$ (FIG. 3), so as to be evacuated from the first chamber 334 continuously by the overflow of the concentrated acid bath $BD_a$ through the central aperture 331 which thus constitutes a discharge outlet of this first chamber 334.

The said mixing movement in the first chamber 334 is moreover so selected that it is sufficiently moderate to maintain the larger fragments of the said solid material in the interior of the first bath $BD_a$ (that is to say, essentially below its surface $303_a$) until the cellulose contained in these larger fragments is more or less completely dissolved in the concentrated acid of this first bath $BD_a$, which pours by overflow into the next chamber 334.

The residence time of each of said fragments in the first bath $BD_a$, until complete dissolution of the cellulose contained therein, will therefore essentially depend on the initial size and shape of each fragment, whilst the fine lignin particles resulting from the dissolution are evacuated continuously by the overflow of this bath $BD_a$ through the central aperture 331 forming discharge outlet.

Accordingly, the feed rate of fragmented impregnated material will be regulated continuously (by means of the distributor 307) depending on the dimensions of the first bath $BD_a$, in such a manner as to avoid any excessive accumulation of this material tending to impair the rapid and complete dissolution in this first bath $BD_a$.

Further, the feed rate of concentrated acid will be controlled by the valve 306, thus determining the rate of overflow discharge through the aperture 331 at the outlet of bath $BD_a$, that is to say, on one hand the mean residence time of the concentrated acid in this bath $BD_a$ and, on the other hand, the rate of removal of the acid and of the fine particles from this bath.

The feed rate of the HCl gas bubbled through the bath $BD_a$ (as well as $BD_b$ and $BD_c$) is furthermore regulated, by means of the three-way valve 314, in order to obtain the desired effect of the gas on the solid material to be dissolved, in combination with the effect of the said moderate mixing movement obtained by the rotation of the main drum DR.

A portion of the HCl gas bubbled through is absorbed in the liquid acid of the bath and thereby increases the concentration of the acid to a greater or lesser extent. However, this increase in acid concentration explains only partly the considerable acceleration of the complete dissolution of the cellulose as achieved by the bubbling through of HCl gas.

After bubbling, the remaining HCl gas leaving the acid bath and filling the free space of the reactor DR above the baths $BD_a$ and $BD_c$, is evacuated continuously from the reactor DR by the exhauster 318 through the pipe 317 and is recycled to this reactor via the recycling pipe 319, the three-way valve 314 and the feed pipe 315. This recycling of the HCl gas is furthermore regulated by this valve 314 so as to maintain a sub-atmospheric pressure in the reactor DR which promotes the degassing of the acid baths, as well as the bubbling action of the HCl, and also prevent the gaseous HCl from escaping into the ambient atmosphere.

The said moderate mixing movement in said baths can be furthermore controlled on one hand by the speed of rotation of the drum DR (driven by a variable-speed device here not shown) and, on the other hand, by the flow rate of the HCl gas bubbled through these baths.

Due to this mixing movement, all the impregnated solid fragments fed continuously to the drum DR are subjected to a good contact not only with the acid of said baths but also with the bubbling HCl gas.

Owing to this combined action of mixing with the acid and the bubbling HCl gas, the lignocellulose material undergoes a swelling and a strong attack by the concentrated liquid acid, so that the cellulose contained therein dissolves very rapidly in this concentrated acid.

The arrangement of several baths in series, as described above and illustrated in FIG. 3, makes it possible to effect the efficient treatment of very large quantities of different lignocellulose materials in the form of irregular fragments, according to the present invention.

This arrangement of the baths $BD_a$, $BD_b$ and $BD_c$ in cascade therefore allows to divide the complete dissolution of the cellulose contained in all the solid fragments into three successive stages, in which these fragments undergo different classifications with regard to size ranges which become narrower from one bath to the next.

In consequence, it ceases to be very important to evacuate only the said fine residual particles of the first bath $BD_a$, since medium-sized fragments which might be discharged from this first bath can undergo a complete dissolution in the following baths $BD_b$ and $BD_c$.

Thus, the adoption of a sufficiently moderate movement to ensure the retention of a major portion of said fragments in the bath until their complete dissolution is not a condition of major importance in this first bath $BD_a$, since the three baths $BD_a$ to $BD_c$ arranged in cascade are available to ensure the complete dissolution in all cases.

Therefore, such an arrangement of several dissolving baths in cascade facilitates the achievement of complete dissolution as provided for according to the present invention, and also makes it possible to increase the capacity in terms of solid material treated per unit volume of these baths.

It is nevertheless obvious that the arrangement of the three component baths in cascade, as described above, is given solely by way of an example. It is therefore understood that the dissolving bath could be subdivided into any number appropriate of component baths in cascade for performing the invention.

It is to be noted further that the bubbling through of HCl gas as described makes it possible to reduce substantially the quantity as well as the concentration of the liquid hydrochloric acid which is required to effect the complete dissolution of the cellulose.

The following examples allow to illustrate more fully the results which can be obtained by performing the invention for dissolving the cellulose contained in different lignocellulose materials.

EXAMPLE 1

In this case, the fragmented lignocellulose material treated was dried wheat straw, composed of fragments of different lengths comprised between 0.5 and 2 cm and the composition of which by weight was 25% pentosans, 40% cellulose and 20% lignin.

To effect the treatment, a bath of 600 cc of hydrochloric acid of 40% strength and at a temperature of 20° C. was placed into a round-bottomed flask which was connected to a Rotavapor-type device capable of imparting a rotary movement to the flask.

After immersing 100 g of dried wheat straw into this acid bath, HCl gas was bubbled through this bath contained in the flask which was set in rotary movement. This bubbling through of HCl gas as well as the rotation of the flask produced an intimate mixing movement of the totality of the bath acid and the immersed straw.

At the same time, a slight under-pressure was maintained above the acid bath contained in the flask in order to promote the degassing of this bath during the bubbling of the HCl gas.

In this manner, the concentration of the acid bath was maintained at saturation level at the operating temperature, that is to say, at 40%, during the treatment.

After 10 to 15 minutes of the described treatment, the cellulose contained in the straw was completely dissolved in the acid of the bath and there was obtained in this manner a suspension of fine particles of insoluble lignin.

By contrast, when the dissolution of the straw was effected by immersion in a bath of hydrochloric acid of 40% strength, with progressive heating up to 30° C. to effect degassing but without bubbling through HCl gas, a treatment time of 45 minutes was required to achieve a similar result, that is to say, a complete dissolution of the cellulose contained in the straw and its conversion into a suspension of fine lignin particles in the acid. In this comparative test, the straw/acid ratio was the same as in the test previously described.

This comparative test accordingly shows that the time necessary to effect the complete dissolution of the cellulose contained in the straw can be reduced by a factor of 3 to 4 due to the bubbling effect of the HCl gas and the degassing of the bath.

After keeping the suspension thus obtained at 30° C. for three hours, it was possible to complete in this manner the hydrolysis of the products dissolved in the acid and derived from the hemicellulose and the cellulose initially contained in the straw. An analysis of the solution resulting from this complete hydrolysis has shown that 90 to 95% of the potential glucose of this straw was dissolved in the acid.

EXAMPLE 2

Various vegetable materials, such as straw, bagasse, sawdust (with a moisture content of about 10%) were respectively subjected to a continuous dissolving treatment in a drum-reactor DR corresponding to the form of embodiment described above with reference to FIG. 3, having a diameter of 60 cm, an overall length of 180 cm and a speed of rotation of one revolution per minute.

The annular walls 327, 328, and 329, respectively defining the level of the three component baths $BD_a$, $BD_b$ and $BD_c$ relative to the bottom of this drum DR had a decreasing radial height of 10, 9 and 8 cm, respectively, the length of each bath was 60 cm and the total volume of these three baths was approximately 50 liters.

There were fed continuously to the inlet of this drum-reactor DR the vegetable matter to be treated and 24 to 37 liters per hour of concentrated hydrochloric acid at 27°–30° C., having a concentration by weight comprised between 39 and 40.5%.

The solid/liquid ratio in this reactor DR was adjusted from case to case depending on the density of the vegetable matter continuously fed thereto, to a value comprised between 1:6 and 1:10.

At the same time, in the bottom of the three baths $BD_a$ to $BD_c$ there was bubbled through continuously hydrogen chloride gas supplied through the bubbler pipes 316a to 316c with a total flow rate of several liters per minute (6 to 10l.), this flow rate being adjusted so as bring about an agitation of the liquid in proximity of the solid material to be attacked.

The vegetable matter fed continuously to the rotary reactor DR, impregnated in the first bath $BD_a$, underwent therein a rapid dissolution and a notable reduction in size under the combined effects of the movement of the mixture due to the slow rotation of the reactor and the HCl gas bubbled through the bath. The fragments of reduced size suspended in the bath were discharged continuously by overflow of the acid at level 303a, through the aperture 334 (FIG. 3), to pass thereafter into the next bath $BD_b$ in which the dissolution continued in the same manner until transfer into the last bath $BD_c$ to effect therein the complete dissolution of the cellulose.

The vegetable matter fed continuously to the reactor DR was thus transformed into a suspension of fine lignin particles which was discharged continuously by overflow into the collector chamber 338.

Under the conditions described above, the means residence time of the vegetable matter in the reactor DR for complete dissolution of the cellulose was of the order of one hour.

Monosaccharides (xylose and glucose) could be recovered from the lignin-acid suspension thus produced in the reactor DR. To this end, this suspension was kept at 30° C. for 3 hours in a maturing vat 342 and then subjected to drying by pulverization in a hot gas stream (spray drying) in order to obtain a powdery mixture of monosaccharides and lignin.

If, whilst operating as above, the bubbling through of gaseous HCl is omitted, the dissolution of the lignocellulose material becomes incomplete, and there is deposited in the chamber 338 a suspension of lignin and cellulose particles not dissolved in the concentrated acid.

We claim:

1. A process for continuously dissolving the cellulose of a lignocellulose material disintegrated by treatment with a solution of concentrated hydrochloric acid, characterised in that:
   (a) the lignocellulose material, previously impregnated with concentrated hydrochloric acid, is immersed in a bath of concentrated hydrochloric acid through which bath hydrogen chloride gas is caused to bubble, under moderate stirring of the bath, and the bubbling and said mixing movement are effected in such a manner and for a sufficient length of time to ensure that substantially all the cellulose contained in the immersed material dissolves in the acid under the combined effects of said movement and said hydrogen chloride gas, thereby to provide a suspension of fine lignin particles in the acid; and
   (b) the bath is fed continuously with concentrated hydrochloric acid solution and lignocellulose material to be treated at respective feed rates such that all the lignocellulose fragments remain essentially immersed within the bath, and the said suspension of fine lignin particles thus produced and suspended in the upper part of the bath is removed continuously by an overflow discharge.

2. A process according to claim 1, characterised in that said acid bath is formed by bubbling of gaseous HCl in a sealed enclosure and that the latter is continuously freed from excess hydrogen chloride gas not dissolved in the bath in the course of said bubbling operation.

3. A process according to claim 2, characterised in that the hydrogen chloride gas expelled from said enclosure is reintroduced so that it is subjected to a repeated cyclic bubbling passage through the bath.

4. A process according to claim 3, characterised in that a slight underpressure is maintained within said enclosure.

5. A process according to claim 1, 2, or 3 characterised in that the acid solution of said bath is maintained in a state of saturation with hydrogen chloride gas which is continuously bubbled through said bath.

6. Apparatus for continuously dissolving in hydrochloric acid the cellulose contained in a fragmented lignocellulose material which leaves fine residual particles in suspension within the acid, characterised in that it comprises:
   (a) an impregnating device having an auxiliary rotating horizontal drum provided with a transverse wall defining an inlet end of this drum and having an axial inlet aperture for admitting the fragmented solid material to be impregnated, liquid feed means for the continuous supply to this auxiliary drum of an adjustable quantity of hydrochloric acid for impregnating and dissolving the fragmented material, means for forming at the bottom of this auxiliary drum an impregnating bath and for causing this bath and the solid material to advance along the bottom of the drum, means for effecting cyclical immersion of the fragmented material in this impregnating bath, and an outlet end constituting a free outlet aperture enabling the continuous discharge of the impregnated fragmented material simultaneously with the acid out of this auxiliary drum; and (b) a main horizontal rotating drum for continuously dissolving the impregnated fragmented material, said main drum having a first transverse wall defining an axial inlet end communicating with the free outlet end of the auxiliary drum, so that the impregnated fragmented material and the acid can pour together continuously into the main drum through its axial inlet aperture, the main drum communicating with the auxiliary drum and with a collector chamber provided at its outlet so as to form together a closed chamber; and wherein (c) the said horizontal main drum is subdivided into a plurality of communicating chambers defined respectively by the said first transverse annular wall at the inlet of the main drum, by at least one intermediate transverse wall in the main drum, and by a final transverse wall defining an outlet end of the main drum;

(d) the said annular transverse walls have respective axial apertures the diameters of which increase from one wall to the next along the main drum in such a manner as to enable the acid to form in the said chambers a plurality of baths disposed in cascade, the overflow of each bath discharging into the next bath and being discharged by a last overflow out of the main drum at its outlet end;

(e) the said main drum is adapted to impart to the impregnated fragmented material immersed in said baths an adjustable mixing movement making it possible to keep the fragments of this material in intimate contact with the acid in the interior of said baths, to keep in suspension the fine residual particles resulting from the partial dissolution of the fragments, and to discharge the suspended fine particles continuously by the said overflow discharge of the acid; and (f) the said main drum is associated with a gas feed device allowing the bubbling of an adjustable quantity of hydrogen chloride gas through said baths, in order to dissolve the cellulose under the combined effects of the gas thus caused to bubble through and of the said adjustable mixing movement.

7. Apparatus according to claim 6, characterised in that it comprises means for evacuating continuously from said closed chamber the hydrogen chloride gas not dissolved during the bubbling operation and for reintroducing this evacuated gas so as to subject it to a cyclical repeated bubbling operation.

* * * * *